UNITED STATES PATENT OFFICE.

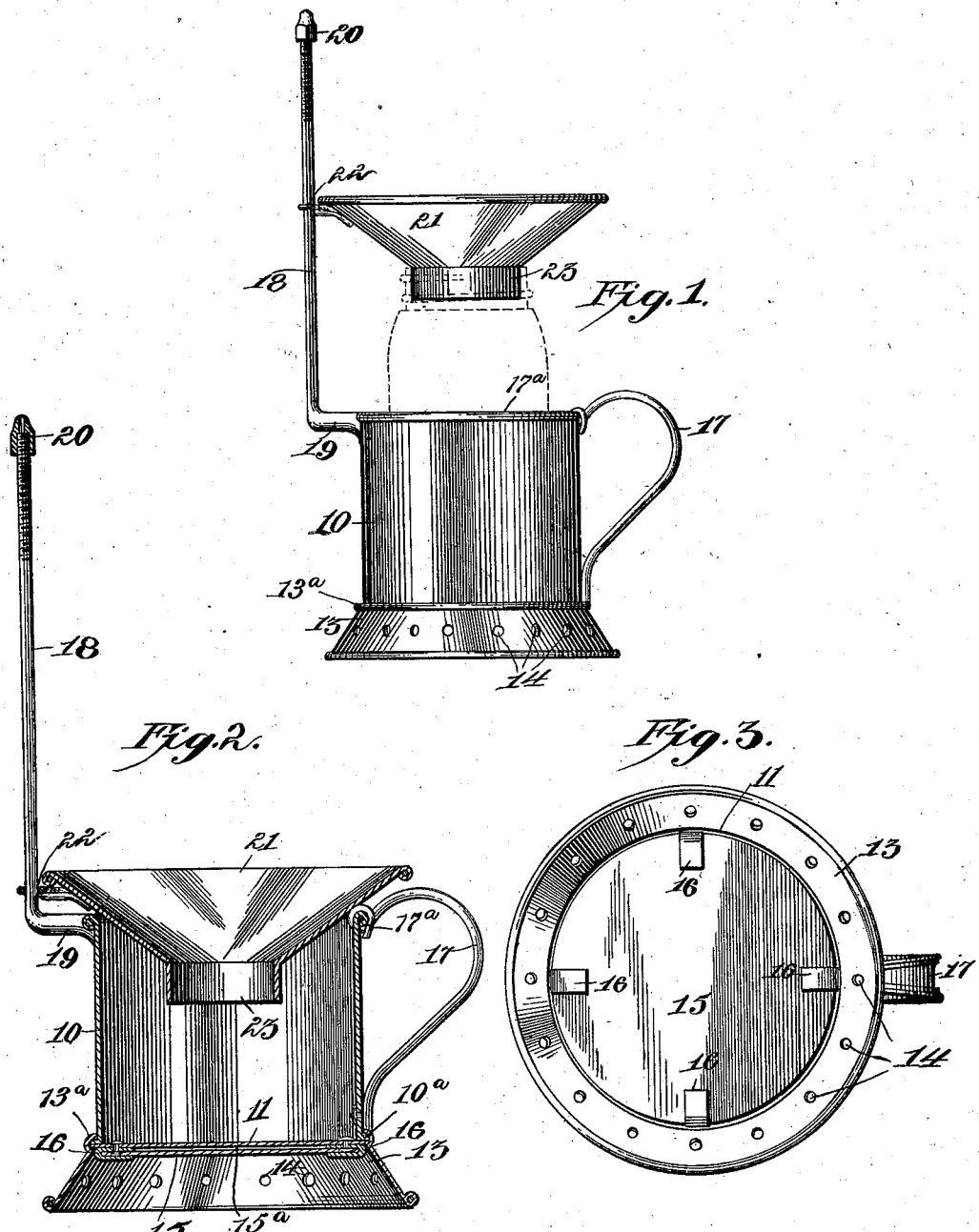

ANNIE FRENCH HORNER, OF ENID, OKLAHOMA TERRITORY, ASSIGNOR OF ONE-HALF TO EDITH M. HILL, OF ENID, OKLAHOMA TERRITORY.

FRUIT-JAR HOLDER.

No. 858,393.  Specification of Letters Patent.  Patented July 2, 1907.

Application filed June 18, 1903. Serial No. 162,097.

*To all whom it may concern:*

Be it known that I, ANNIE FRENCH HORNER, a citizen of the United States, residing at Enid, in the county of Garfield and Territory of Oklahoma, have invented a new and useful Fruit-Jar Holder, of which the following is a specification.

This invention relates to a device for facilitating the filling of fruit jars, or other receptacles. In devices of this character, it is customary to employ a suitably heated receptacle within which the fruit jar is placed and filled through the medium of a funnel carried by the receptacle and adjustable vertically to accommodate jars of different sizes. In the practice of various methods of jar filling, the receptacle is filled with water, which surrounds the jar, or the jar is wrapped in wet cloths or is left entirely uninclosed except by the walls of the receptacle. In any event, however, the usual construction of the receptacle makes it impossible to allow the jar to rest directly upon the bottom thereof because of the liability of burning the fruit at the bottom of the jar. To avoid this difficulty, it is customary to employ various supports, flanges, brackets, etc., spaced from the bottom of the receptacle, and designed to support the jar at a sufficient elevation to avoid the possibility of burning the fruit. Furthermore, in devices of this class the insertion or removal of the jars is ordinarily obstructed by the funnel, which must either be raised high above the jar or entirely removed from its support, in order to permit the jar to be placed within or removed from the receptacle.

Having in mind these objectionable characteristics of those can filling devices with which I am acquainted, my object is to produce a device so constructed that the necessity for employing internal racks or other supports for the jar will be avoided, while the requisite high temperature of the contents of the receptacle will be insured by the circulation of hot air in immediate proximity to the exterior of its walls.

A further object is to provide the device with a supplemental handle opposite the ordinary handle so that the device may be supported at both sides while being manipulated, and to utilize an extension of the supplemental handle as a funnel guide so that the funnel may be of greater diameter than the receptacle and may rest upon the upper edge of the latter to permit the fruit to drip into the receptacle therefrom.

A still further object is to combine with a device having the foregoing characteristics, a connection between the funnel and guide so arranged that the funnel may be raised or lowered to accommodate jars of different sizes, or swung laterally away from its normal position above the receptacle and automatically held in such position by its own weight and without the use of retaining springs or of similar devices.

To the accomplishment of these objects, and others subordinate thereto, the present embodiment of the invention resides in those features of construction and arrangement hereinafter described, illustrated in the accompanying drawings, and succinctly defined in the appended claims.

In the accompanying drawings—Figure 1 is a side elevation of the device in use, the jar being indicated in dotted lines. Fig. 2 is a vertical section through the device with the funnel supported upon the upper edge of the receptacle to permit the fruit juice to drip into the latter, and Fig. 3 is a bottom plan view of said device.

Each part is indicated by the same reference character in the several views.

10 indicates an open-topped liquid-tight cylindrical receptacle having imperforate bottom and side walls, the bottom wall being indicated by 11. At the lower edge of the side wall of the receptacle is an outwardly extending annular flange $10^a$ against the under side of which the outer margin of the bottom wall 11 is imposed, said bottom wall being of slightly greater diameter than the receptacle.

Below the receptacle, and serving as a hollow support therefor, is an annular downwardly flared flange or base 13, the upper edge of which is formed with an annular bead $13^a$ within which the flange $10^a$ and the outer margin of the bottom wall are clamped, the base thus serving as means for connecting the bottom and side walls of the receptacle. For the purpose of preventing excessive heating of the bottom wall 11 when the device is placed directly upon a hot stove, as for instance, alongside of a kettle in which the fruit is stewing, an asbestos or other non-combustible insulating pad 15 is retained below the bottom wall 11 by retaining devices 16. These retaining devices are preferably in the form of tongues, the upper portions of which lie flat against and are riveted or otherwise secured to the under side of the bottom wall 11 to constitute spacing devices located between the bottom wall and the asbestos pad to provide an intermediate air-space $15^a$, the lower ends of the tongues being bent inwardly under the pad 15 to detachably retain the same in place. The separation of the pad from the bottom wall further insulates the latter, since it prevents the highly heated pad from directly contacting with the metal, it being understood that while the asbestos is non-combustible, it is capable of being intensely heated and therefore its separation from the bottom wall 11 materially decreases the possibility of burning the fruit in a jar resting directly upon said bottom wall.

By insulating the bottom wall 11 in the manner described, I am enabled to dispense with the ordinary internal jar supports usually employed to separate the bottom of the jar from the hot bottom wall of the receptacle. Furthermore, the detachable retention of the pad enables the latter to be easily removed when it is desired to clean the under side of the bottom wall 11 or when the heater in connection with which the device is used is not sufficiently hot to require the use of insulation for the receptacle. It will of course be understood that unless provision is made to the contrary, this insulation of the receptacle bottom will prevent the receptacle as a whole from being heated with facility to the required temperature. I therefore provide in the flaring base 13 a series of openings 14 located in a horizontal plane below the asbestos pad and in vertical planes just outside of or beyond the wall of the receptacle 10. This location of the openings 14 is material for two reasons: In the first place, it provides a free circulation of the hot air through the hollow base 13, and in the second place, the hot air passing outwardly through the openings 14, rises upon the exterior of the receptacle and immediately in contact with the cylindrical wall thereof. Thus, while I provide a receptacle with a broad base, which insures its stability, and with means for insulating the bottom wall thereof so that the jars may rest directly thereon, I also provide for the heating of the side walls of the receptacle so that the required temperature thereof may be attained.

At one side of the receptacle 10 is secured a handle 17, the upper end of which is bent around the bead 17ª formed at the upper edge of the cylindrical side wall, the lower end of the handle preferably resting on the bead of the base 13. At a point diametrically opposite the handle 17 and likewise extending radially from the receptacle, is a supplemental handle 19 provided at its outer end with a vertical extension or standard 18 threaded at its upper end to receive a retaining nut or stop 20. It will thus be seen that the receptacle is provided with radially disposed handles at diametrically opposite points so that in moving the device from one place to another, it may be supported from both sides and may therefore be carried with facility, even when hot, and when burdened with a filled jar of fruit.

Disposed above the receptacle 10 is a funnel 21 which is of greater diameter than the receptacle, and is provided at its bottom with a discharge spout 23 which fits in the jar when the latter is being filled, as shown in Fig. 1, and extends into the receptacle when the funnel rests upon the upper end of the latter, as shown in Fig. 2, so that the drippings from the funnel may be caught by the receptacle. It will be noted that by supporting the standard 18 at the outer end of the radially disposed handle 19, the standard is sufficiently offset from the wall of the receptacle to permit the employment of a funnel of greater diameter than the receptacle, without necessity for perforating the funnel. This is material, for the reason that in those devices in which the standard extends up through an opening in the funnel the fruit poured into the funnel is apt to escape through the opening and drip down the sides of the receptacle to the top of the stove, soiling the latter and giving off objectionable fumes or odors.

I now come to a most important feature of the invention, to-wit, the connection between the funnel and standard, which permits the funnel to be raised or lowered or swung laterally, and which causes the weight of the funnel to automatically lock the same in any position to which it may be adjusted. Extending outwardly from the funnel 21 adjacent to its upper edge, is a narrow eye or ring 22 embracing the standard 18, but of sufficient size to move freely upon the standard when the axis of the ring is alined with the axis of the standard, or in other words, when the ring extends in true right-angular relation to the standard.

It is desired to emphasize the fact that the ring or eye 22 is narrow, as distinguished from a sleeve, or an elongated guide. The employment of a sleeve or an elongated guide in lieu of the narrow eye 22 would effect a sliding connection between the standard and the funnel, but additional retaining means, as for instance, a spring, or the like, would have to be provided to hold the guide in its adjusted positions. The eye 22 on the contrary, not only permits the funnel 21 to be adjusted vertically, in order to accommodate jars of different sizes, but enables the funnel to be swung laterally, away from its normal position above the receptacle, and also frictionally, engages or bites the opposite sides of the standard 18 to automatically lock the funnel against gravitation, as soon as the funnel is released by the operator. In other words, when the funnel is grasped in the act of raising it, the eye 22 assumes a position at right angles to the standard 18, and slides freely thereon, but as soon as the funnel is released, its weight tilts the eye 22 slightly and causes it to grip opposite sides of the standard with sufficient force to prevent the gravitation of the funnel.

From what has been said, it will be seen that I have produced a simple, inexpensive, and efficient device embodying means whereby the several stated objects of the invention may be attained.

Having thus fully described my invention, what I claim as new, and desire to secure by Letters Patent, is:—

1. A device of the character described, including a receptacle, a base supporting the same, an insulating pad inclosed by the base, and means for retaining the insulating pad adjacent to but slightly spaced from the bottom wall of the receptacle.

2. A device of the character described, including a receptacle, an insulating pad, and means retaining said pad and extended between the pad and the bottom wall of the receptacle to space the same apart.

3. A device of the character described, including a jar-receiving receptacle, a hollow supporting base therefor, an asbestos pad inclosed by the base, and pad-retaining tongues having their upper ends interposed between the pad and the bottom wall of the receptacle to space the pad from said wall and provide an intermediate air space.

4. A device of the class described, including a jar-receiving receptacle having imperforate walls, an annular supporting flange or base, provided with openings, located in an annular plane immediately beyond or outside of the walls of the receptacle, a non-combustible insulating pad inclosed by the supporting flange and located below the bottom of the receptacle and above the plane of the openings in the flange, to permit the heated air to circulate through the base below the pad and thence through the openings and around the side walls of the receptacle, and means for detachably retaining the pad.

5. A device of the character described, including a jar-receiving receptacle, handles extending radially therefrom at diametrically opposite points, a funnel of greater diameter than the receptacle and adapted to rest thereon while dripping, a standard rising from the outer end of one of the handles and located beyond the edge of the funnel, and a connecting device extended from the funnel and arranged to both slide and rotate upon the standard.

6. A device of the character described, including a jar receiving receptacle, handles extending radially therefrom at diametrically opposite points, a funnel of greater diameter than the receptacle and adapted to rest thereon while dripping, a standard rising from the receptacle and located beyond the edge of the funnel, and a connecting device extended from the funnel and arranged to both slide and rotate upon the standard.

7. A device of the character described, including a jar-receiving receptacle, handles extending radially therefrom at diametrically opposite points, a funnel normally located above and of greater diameter than the receptacle to permit it to rest upon the latter, a standard rising from the outer end of one of the handles and located beyond the edge of the funnel and a narrow eye fixed to the funnel and loosely encircling the standard, said eye being both slidable and rotatable on the standard and urged into gripping relation therewith by the weight of the funnel.

In testimony, that I claim the foregoing as my own, I have hereto affixed my signature in the presence of two witnesses.

ANNIE FRENCH HORNER.

Witnesses:
S. GRUNES SPROAT,
S. W. HILL.